(12) United States Patent
Aggarwal et al.

(10) Patent No.: US 6,236,985 B1
(45) Date of Patent: May 22, 2001

(54) SYSTEM AND METHOD FOR SEARCHING DATABASES WITH APPLICATIONS SUCH AS PEER GROUPS, COLLABORATIVE FILTERING, AND E-COMMERCE

(75) Inventors: Charu Chandra Aggarwal, Yorktown Heights; Joel Leonard Wolf, Katonah; Philip Shi-Lung Yu, Chappaqua, all of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/168,117

(22) Filed: Oct. 7, 1998

(51) Int. Cl.$^7$ .................................................. G06F 17/30
(52) U.S. Cl. ..................................... 707/2; 707/6; 705/37
(58) Field of Search ................................. 707/5, 1–4, 6, 707/100, 102, 104; 705/37, 36, 38, 10, 7; 706/45, 46

(56) References Cited

U.S. PATENT DOCUMENTS

| | | | |
|---|---|---|---|
| 5,845,276 | * 12/1998 | Emerson et al. | 707/2 |
| 6,012,058 | * 1/2000 | Fayyad et al. | 707/6 |
| 6,026,398 | * 2/2000 | Brown et al. | 707/5 |
| 6,049,797 | * 4/2000 | Guha et al. | 707/6 |
| 6,049,861 | * 4/2000 | Bird et al. | 712/28 |
| 6,061,658 | * 5/2000 | Chou et al. | 705/10 |
| 6,148,295 | * 11/2000 | Megiddo et al. | 707/3 |

OTHER PUBLICATIONS

"Iterate: A conceptual Clustering Algorithm for Data Mining," Biswas et al., IEEE Transactions on Systems, Man, and Cybernetics—Part C, Applications and Reviews, vol. 28, No. 2, pp. 219–230, May, 1998.*

R. Sibson, "SLINK: An Optimally Efficient Algorithm for the Single–Link Cluster Method", *The Computer Journal*, The British Computer Society, vol. 16, No. 1, Feb. 1973.

Tian Zhang et al., "BIRCH: An Efficient Data Clustering Method for Very Large Databases", Proceedings of the ACM SIGMOND International Conference on Management of Data, Montreal, Canada, Jun. 1996, pp. 103–114.

Raymond T. Ng et al., "Efficient and Effective Clustering Methods for Spatial Data Mining", Proceedings of the 20$^{th}$ International Conference on Very Large Data Bases, Santiago, Chile, 1994, pp. 144–155.

Nick Roussopoulos et al., "Nearest Neighbor Queries", Proceedings of the ACM–SIGMOD International Conference on Management of Data, 1995, pp. 71–79.

Stefan Berchtold et al., "Fast Nearest Neighbor Search in High–dimensional Space", Proceedings of the International Conference on Data Engineering, Feb. 1998, pp. 209–218.

David A. White et al., "Similarity Indexing with the SS–Tree", Proceedings of the 12$^{th}$ International Conference on Data Engineering, New Orleans, U.S.A., Feb. 1996, pp. 516–523.

(List continued on next page.)

*Primary Examiner*—Hosain T. Alam
(74) *Attorney, Agent, or Firm*—F. Chau & Associates, LLP

(57) ABSTRACT

A method of analyzing information in the form of a plurality of data records. Each data record includes one or more data values. The data values are partitioned into a plurality of data signatures. Data values of data signatures are compared to data values of data records. Based on the result of the comparison an index is associated with each data record. A bound corresponding to the index is calculated based on a user defined target value and an objective function. If desired, information may be analyzed for finding peer groups in e-commerce applications.

29 Claims, 7 Drawing Sheets

OTHER PUBLICATIONS

Stefan Berchtold et al., "The X–Tree: An Index Structure for High–Dimensional Data", Proceedings of the 22$^{nd}$ International Conference in Very Large Databases, 1996, pp. 28–39.

Douglas H. Fisher, "Knowledge Acquisition Via Incremental Conceptual Clustering", Machine Learning 2(2), 1987, pp. 139–172.

Mohamed Zait et al., "A Comparative Study of Clustering Methods", FGCS Journal, Special Issue on Data Mining, 1997, pp. 149–159.

Samet H., Design and Analysis of Spatial Datastructures, Addison Wesley, 1993, pp. 135–141.

* cited by examiner

SYSTEM AND METHOD FOR SEARCHING DATABASES WITH APPLICATIONS SUCH AS PEER GROUPS, COLLABORATIVE FILTERING, AND E-COMMERCE

FIELD OF THE INVENTION

The present invention relates generally to searching high-dimensional databases. In particular, related information in a database is identified by performing a similarity search. Furthermore, the present invention relates to an automated system and method for detecting records in a database that are similar to user defined target records.

BACKGROUND OF THE INVENTION

The increased popularity of electronic commerce, and progress in technologies such as bar-codes have made it possible to automatically store sales data. For example, electronic transactions over the Internet allow retail organizations, banks, and governments, for example, to store and maintain information related to customer behavior. Retail organizations, for example, may wish to store information concerning customers buying behavior. In order to better serve customers, it may be desirable to target marketing information. In other words, it may be desirable to deduce, from stored information of past customer behavior, what type of information may interest which customers. Information regarding one customer may, for example, be deduced on the basis of the behavior of other customers identified as "similar" or "peers".

In the case of retail organizations, for example, transaction records may take the form of market basket transactions. Each market basket transaction may include an item or set of items (data value(s)) which may be bought together by a customer. For example, transaction records of a supermarket may be {Milk, Bread, Butter}, and {Pepsi, Diet Coke, Sprite}.

It is logical to expect that market transactions of a particular customer be strongly correlated with each other. For example, it is likely that the items in an individual customers' weekly shopping list are correlated m from week to week. Similarly, it is possible that two individual customers exhibit correlation in their buying patterns. Suppose, for example, that customer A and customer B are each associated with the following transactions:

Customer A<={Bed_sheet, Pillow, Comforter, Pillowcase}

Customer B<={Pillow, Comforter, Pillowcase, Nightstand}. It seems likely that customer A and customer B have correlated behavior. Thus, it may be possible to make personalized recommendations to customer A based of the behavior of customer B, and vice versa. For example, buying a "Nightstand" may be recommended to customer A, or buying a "Bed_sheet" may be recommended to customer B. Deducing the preferences of a given user by examining information about the preferences of other similar users is often referred to as collaborative filtering.

Collaborative filtering is possible when customers, such as customers A and B above, for example, are determined to be "similar". "Similarity" between customers may be judged based on records in a transaction database and on a similarity criteria or objective function. Specifically, the problem of finding similar, neighboring, or peer records (similarity searching) is that of finding the data record or set of k data records in a database that is/are closest, in the sense of an objective function, to a given target value.

Many methods have been previously described for searching a database. In particular, several similarity search methods have been proposed. For example, White D. A., and Jain R., 'Similarity Indexing with the SS-Tree,' Proceedings of the 12th International Conference on Data Engineering, New Orleans, U.S.A., pages 516–523, February, 1996; Roussopoulos N., Kelley S., and Vincent F., 'Nearest Neighbor Queries,' Proceedings of the ACM-SIGMOD International Conference on Management of Data, 1995, pages 71–79; Samet H., Design and Analysis of Spatial Datastructures, pp. 135–141, Addison Wesley, 1993. These techniques are known to be efficient for data for which records include numerical data values, and for data for which the number of possible data values associated with each record is relatively small (e.g. 5–8 data values/record). In the case of non-quantitative data values, and a relatively large number of data values per data record (e.g. in the range of thousands data values/record), however, these techniques may not be applicable.

SUMMARY OF THE INVENTION

A method of analyzing information in the form of a plurality of data records. Each data record includes one or more data values. The data values are partitioned into a plurality of data signatures. Data values of data signatures are compared to data values of data records. Based on the result of the comparison an index is associated with each data record. A bound corresponding to the index is calculated based on a user defined target value and an objective function.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity.

DETAILED DESCRIPTION OF THE INVENTION

Data records or transaction records may be stored in a computer database. Each data record may include one or more data values (i.e. a data record is a subset of the set of data values). Data values represent information about attributes of physical objects such as, for example, information about merchandise offered for sale by a retail organization. Each data value may be included in a data record and stored in a database by measuring physical attributes of objects. For example, when a customer makes a purchase the bar code on each item may be scanned into memory. All the data values representing items purchased by the customer on a particular date may be included in a data record.

Figure 1:
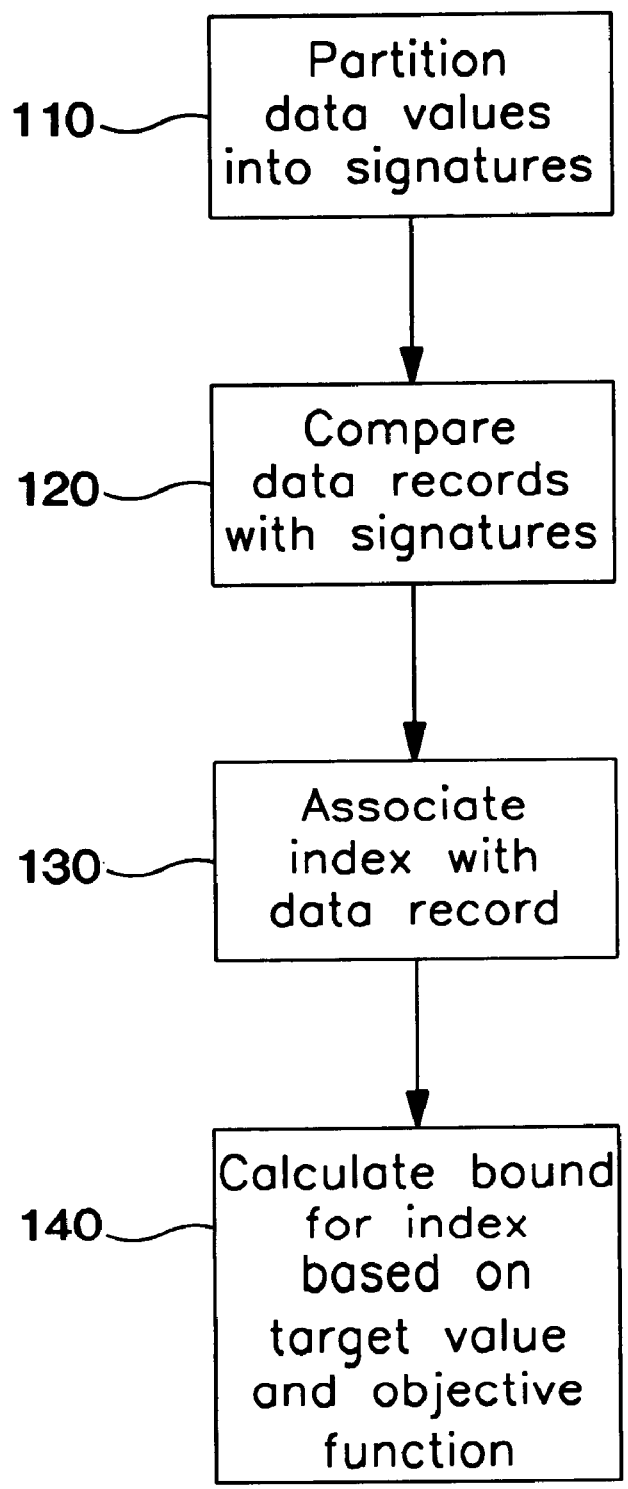
FIG. 1 is a flow diagram illustrating a method of analyzing information in accordance with an exemplary embodiment of the present invention.

A flow diagram illustrating a method of analyzing information in accordance with an embodiment of the present invention is shown in FIG. 1. In step 110 a partition of the set of data values is formed. The set of data values is divided into subsets. The subsets forming the partition are called data signatures. A data signature may be thought of as a "superdimension" identifying a subset of data values.

Figure 2:
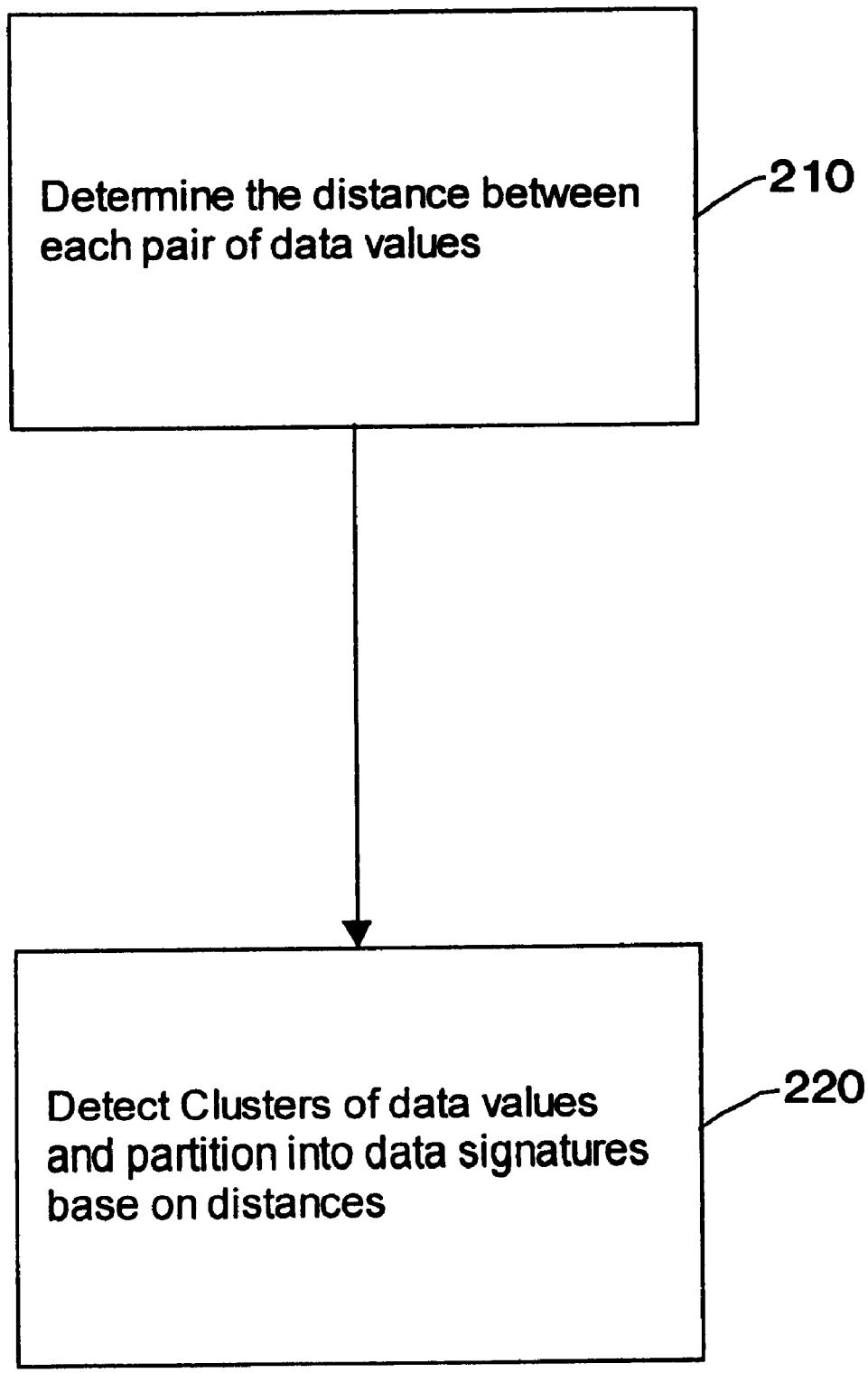
FIG. 2 is a flow diagram illustrating a recipe for partitioning data values into data signatures.

FIG. 2 is a flow diagram illustrating a recipe for partitioning data values into data signatures. Preferably, clustering may be used to partition the set of data values into data signatures. In order to apply a clustering method to the set of data values it is desirable to define the distance between any two data values. In step 210 the distance between all pairs of data values is determined. The distance between two data signatures may be defined based on the percentage of the data records, which include both data values. Given two data values, the percentage of the data records which include both data values is referred to as the support of the two data values. One may, for example, define the distance between two data values to be the inverse of the support of the two data values. Once the distance between any two data values is determined, a clustering method may be applied to partition the set of data values into data signatures. In step 220 clustering is applied to partition the set of data values into data signatures, based on the result of step 210. A discussion of clustering methods may be found, for example, in Sibson R., 'SLINK: An optimally efficient algorithm for the single-link cluster method', The Computer Journal, Vol. 16, No. 1, February 1973, British Computer Society, incorporated by reference herein.

Let $D_{val}$ be a set of data values. Let $P_{sig}$ be a corresponding set of data signatures, i.e. if $S \in P_{sig}$ then $S \subseteq D_{val}$. Let $T \subseteq D_{val}$ be a data record. Data record T activates data signature $S \in P_{sig}$ at a level $\tau$ if $$|S \cap T| \geq \tau \qquad (1)$$

where the notation $|\cdot|$ indicates the cardinality of a set. For example, suppose that the set of data values includes 20 elements labeled 1 through 20, i.e. suppose $D_{val}=\{1,2,\ldots,20\}$. Suppose further that $P_{sig}=\{S_P, S_Q, S_R\}$ where signature $S_P=\{1,2,4,6,8,11,18\}$, signature $S_Q=\{3,5,7,9,10,16,20\}$, and signature $S_R=\{12,13,14,15,17,19\}$. If a Data record $T=\{2,6,17,20\}$ is given, then T activates signatures $S_P, S_Q,$ and $S_R$ at a level $\tau=1$, and T activates signature $S_P$ at a level $\tau=2$. In step 120 of FIG. 1 data values included in data signatures are compared with data values included in a data record. A positive comparison results in step 120 if, for example, condition (1) above is satisfied. In other words, a positive comparison results, between a data signature and a data record, if the signature is activated by the data record at a level $\tau$. The activation level $\tau$ may be chosen, for example, by a user.

In step 130 an index is associated with a data record based on the comparison result of step 120. Suppose that the data signatures are ordered (e.g. 1 through K, for K data signatures). A Boolean number may be used as an index. A Boolean index may be associated with the data record according to the following rule:

set the i-th position of the Boolean index to 1 if the data record activates the i-th signature at a level $\tau$, otherwise set the i-th position of the Boolean index to 0.

For example, if there are three data signatures and if a data record activates the first and the third data signatures (at a level $\tau$), then the index 101 may be associated with the data record. Hence, if there are K data signatures, for example, there are $2^K$ possible indices.

Steps 120 and 130 of FIG. 1 may be repeated until an index is associated with each data record. The data records may then be organized using a signature table. Each entry in the signature table corresponds to an index. Thus, if there are K data signatures, for example, there are $2^K$ possible entries in the signature table. An entry in the signature table may be, for example, a pointer to a consecutive list of pages containing a subset of data records associated with an index. Entries in the signature table may be thought of as "supercoordinates" to the data records, where each "supercoordinate" maps to a subset of the data records associated with one index. The signature table provides a compressed representation of the data records in terms of the associated indices. For example, consider a case where a retail organization offers for sale one thousand items represented by one thousand data values. A purchase or data record may contain any one of $2^{1000}-1$ nonempty subsets of the one thousand items. If, however, the one thousand items are partitioned into ten data signatures ("superdimensions") then only $2^{10}$ indices or "supercoordinates" are obtained.

In step 140 a bound may be calculated corresponding to each index, and in turn corresponding to each entry in a signature table. The bound is calculated based on a measure of similarity between a user defined target value (or values) and the subset of data records which are associated with an index. A target value, like a data record, may be given as a nonempty subset of the set of data values.

The notion of similarity between data records stored in a database may be defined in terms of an objective function. The objective function is a measure for comparing data records on the basis of data values included in the data records. The objective function may be specified, for example, by a user. Suppose, for example, that each data record is represented by a Boolean number, i.e. a number comprised of "ones" and "zeros". Assume that there are n possible (ordered) items for sale, i.e. n possible data values $\{V_1, \ldots, V_n\}$. Let the numeral 1 correspond to an item that was purchased and the numeral 0 correspond to an item that was not purchased. A transaction record or data record may be represented by a m-digit Boolean number, $m \leq n$. If a particular customer purchases, for example, only items $V_1, V_3,$ and $V_n$ at a particular time, then a corresponding transaction record may take the form $$\underbrace{10100\ldots001}_{n},$$

whereas if a particular customer purchases, for example, only items $V_2, V_4,$ and $V_6$ then a corresponding transaction record may take the form 010101.

Let A be a Boolean number corresponding to a first data record and let B be a Boolean number corresponding to a second data record. The following are examples of objective functions:

(a) Match number: The number of positions occupied by the numeral 1 in both data record A and data record B (e.g. the number of items purchased that are common to transaction A and transaction B).

(b) The inverse of the hamming distance, where the hamming distance is defined as the number of positions which are either occupied by the numeral 1 in data record A but not in data record B or occupied by the numeral 1 in data record B but not in data record A (e.g. the number of items purchased in transaction A but not transaction B or vice versa).

(c) The ratio of the match number to the hamming distance.

(d) The cosine coefficient of data record A and data record B defined by $$c_{\cos}(|A|, |B|) = \frac{x}{|A|^{1/2} \cdot |B|^{1/2}} = \frac{x}{(2x + y - |B|)^{1/2}|B|^{1/2}},$$

where x is the match number for A and B, y is the hamming distance for A and B, and the notation |•| indicates the number of positions of a Boolean number occupied by the numeral 1.

All of the above examples of objective functions fall into the more general class of objective functions taking the form $$f(x, y) := f(\text{Match number, Hamming distance}). \tag{2}$$

Note that (d) above falls into this class if it is assumed that the value |B| is known. Such an assumption is reasonable if B is, for example, a target value provided by a user.

Suppose that the objective function f(x, y) satisfied the following conditions:

$$\frac{\Delta f(x, y)}{\Delta x} > 0, \tag{3}$$

$$\frac{\Delta f(x, y)}{\Delta y} < 0. \tag{4}$$

Note that condition (3) implies that the objective function increases with the match number, and condition (4) implies that the objective function decreases with the hamming distance. Exemplary objective functions (a)–(d) above satisfy conditions (2) and (3).

The following explanation may be helpful for understanding the invention. Suppose f(•,•) satisfies conditions (3) and (4) above. Let x≦γ and θ≦y. Then, $$f(x,y) \leq f(\gamma, \theta). \tag{5}$$

In other words, if γ is an upper bound (or optimistic bound) for the match number and θ is a lower bound (or optimistic bound) for the hamming distance then f(γ, θ) is an upper bound (optimistic bound) for the objective function f(x, y). Therefore, it may be possible to estimate the similarity between a target value (or values) and a subset of data records associated with an index, by calculating optimistic values for the match number and the hamming distance. Evaluating a given objective function (satisfying conditions (3) and (4) above) at the optimistic match number and hamming distance may hence give an optimistic bound associated with an index in step 140.

Figure 3:
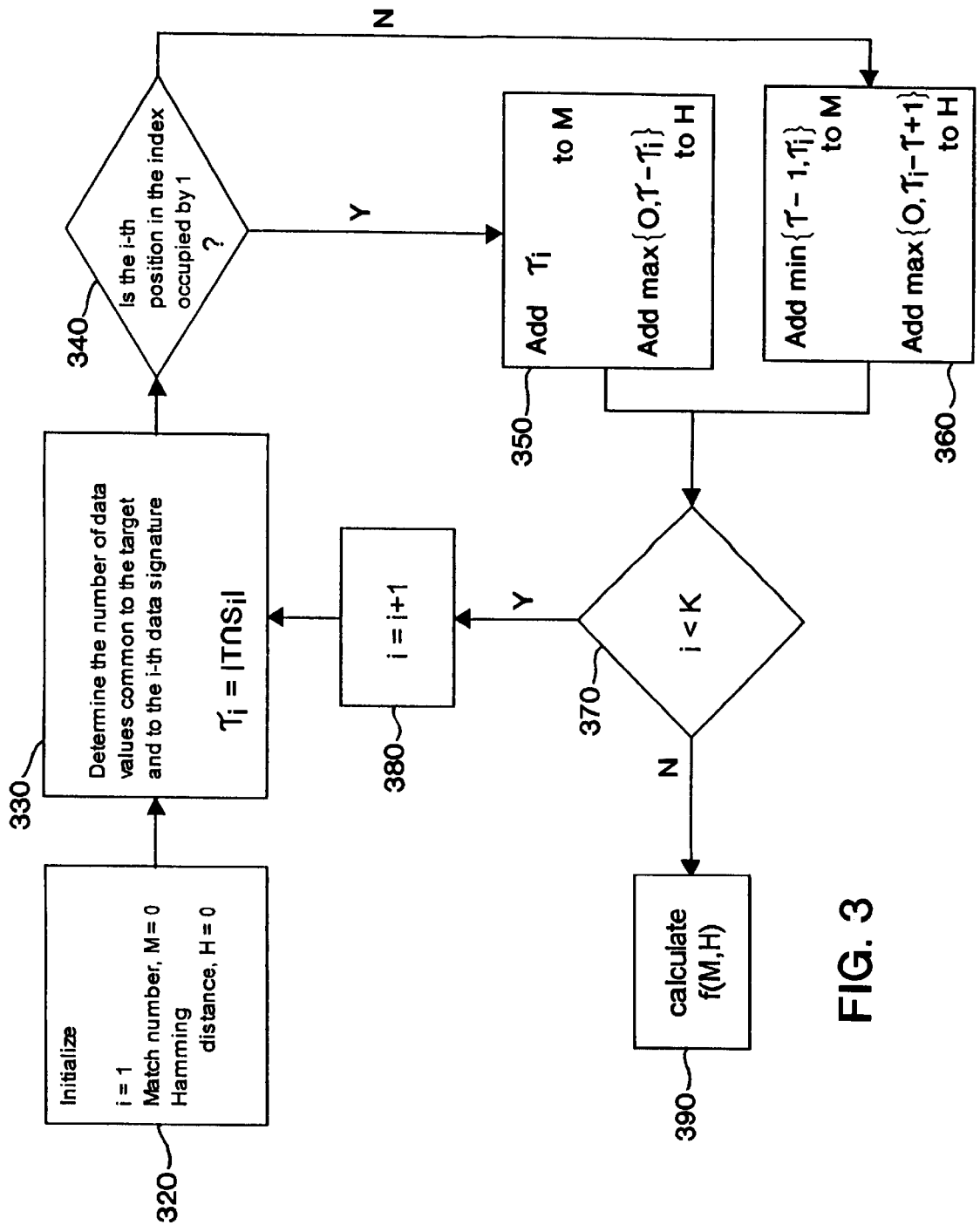
FIG. 3 is a flow diagram illustrating a recipe for calculating an optimistic bound corresponding to a A Boolean index based on a given objective function and a user defined target value.

FIG. 3 illustrates a recipe for calculating such an optimistic bound corresponding to a Boolean index based on a given objective function f(•,•), and a user defined target value $T \subseteq D_{val}$. Assume that the set of data values ($D_{val}$) has been partitioned into K data signatures $S_1, S_2, \ldots, S_K$, and let the activation level be τ. Let a K position Boolean index be written $I_{ndx} = p_1 p_2 \ldots p_K$, where $p_i \in \{0,1\}$. In step 320 a counter i is initialized to one. The counter i indicates the i-th position $p_i$ of the Boolean index. In step 320 the variables M and H, representing optimistic bounds on the match number and hamming distance respectively, are also initialized to zero. In step 330 the number of data values $\tau_i = |T \cap S_i|$ that are common to both target value T, and the i-th data signature $S_i$ are determined. In step 340 a decision is made whether the i-th position of index $I_{ndx}$ is occupied by the numeral 1, i.e. whether $p_i=1$.

If $p_i=$ then every data record associated with index $I_{ndx}$ has at least τ data values in common with i-th data signature $S_i$. But it is possible that target value T has $\tau_i < \tau$ data values in common with data signature $S_i$, i.e. target value T does not activate the i-th data signature. Thus, an optimistic bound for the hamming distance between target value T and data values associated with index $I_{ndx}$ (with respect to the i-th position) is max{0,τ-$\tau_i$}. Further, if $p_i=1$ then an optimistic bound for the match number between target value T and data values associated with index $I_{ndx}$ (with respect to the i-th position) is $\tau_i$.

If $p_i=0$ then every data record associated with index $I_{ndx}$ has less than T data values in common with i-th data signature $S_i$. But it is possible that target value T has $\tau_i \geq \tau$ data values in common with data signature $S_i$, i.e. target value T activates the i-th data signature. Thus, an optimistic bound for the hamming distance between target value T and data values associated with index $I_{ndx}$ (with respect to the i-th position) is max{0,$\tau_i$-τ+1}. Further, If $p_i=0$ then an optimistic bound for the match number between target value T and data values associated with index $I_{ndx}$ (with respect to the i-th position) is min{τ-1, $\tau_i$}.

Hence, in step 350 ($p_i=1$) max{0,τ-$\tau_i$} is added to H (an optimistic bound for the hamming distance between target value T and data records associated with index $I_{ndx}$) and $\tau_i$ is added to M (an optimistic bound for the match number between target value T and data records associated with index $I_{ndx}$). In step 360 ($p_i=0$) max{0,$\tau_i$-τ+1} is added to H, and min{τ-1, $\tau_i$} is added to M. In step 370 a decision is made whether all of the K positions of index $I_{ndx}$ have been considered, i.e. has the loop 330, 340, 350 or 360, 370, and 380 been performed K times. If every position of index $I_{ndx}$ has been considered then an upper or optimistic bound f(M,H) on the "similarity" between target value T and data records associated with index $I_{ndx}$ may be calculated in step 390. In the case of more than one target value, an upper bound on the "similarity" between the target values and data records associated with index $I_{ndx}$ may be calculated, for example, by averaging the individual bounds calculated based on each target value.

Note that the bound corresponding to an index calculated by the recipe illustrated in FIG. 3 may be calculated based on a target value and an objective function. Therefore, for a given target value and objective function, $2^K$ bounds may be calculated corresponding to $2^K$ possible indices by repeating the steps illustrated in FIG. 3 (assuming that $D_{val}$ has been partitioned into K data signatures). A signature table containing $2^K$ entries may then be sorted in descending order of corresponding optimistic bounds. By descending in order through the signature table it may be possible to efficiently search the subsets of data records pointed to, respectively, by the entries in the signature table.

Figure 4:
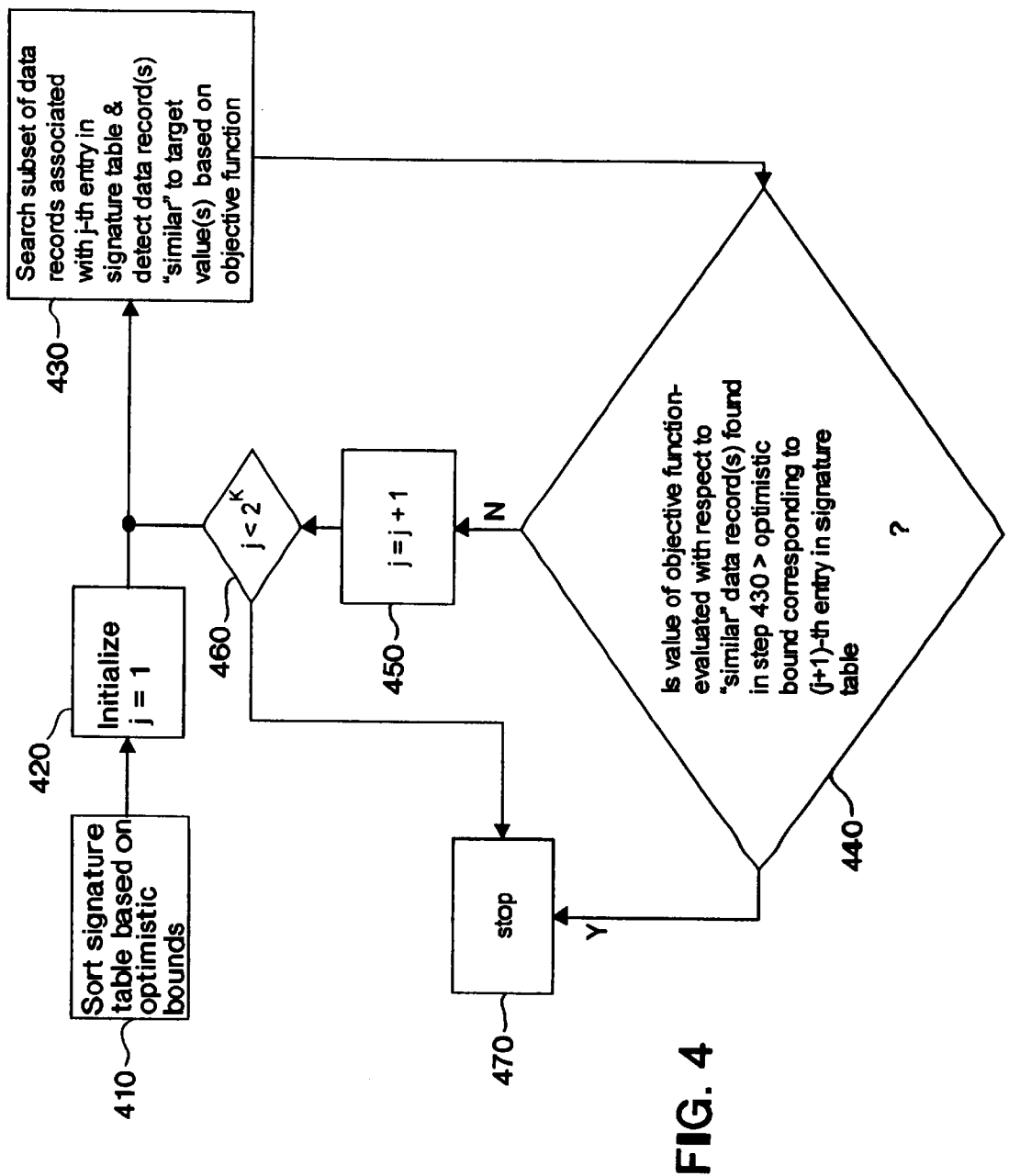
FIG. 4 is a flow diagram illustrating a branch and bound method for searching a signature table and detecting data records that are "similar" to a target value based on an objective function.

FIG. 4 is a flow diagram illustrating a branch and bound method for searching a signature table and detecting data records that are "similar" to (or comparable to) a target value based on an objective function. In step 410 the indices associated with subsets of data records are sorted in descending order based on the bounds calculated, for example, by a recipe such as that given in FIG. 3. Entries in a signature table corresponding to the indices may then be rearranged in the same order. In step 420 a counter is initialized to one. The counter j indicates the j-th position in the signature table. If the set of data values is partitioned into K data signatures then there are $2^K$ indices and hence, $2^K$ corresponding entries in the signature table. In step 430 the subset of data values associated with the j-th entry in the signature table may be searched. Data records associated with the j-th entry in the signature table may be compared with a user defined target value(s). One or more data values that are most similar to the target value(s) may be detected, where "similarity" is based on the objective function.

For example, suppose L similar data records are sought. Note that the integer L may be user defined. Let $dr_{j1}, \ldots, dr_{jq}$ be the subset of data records that are associated with the j-th entry in the signature table. Let $T_1, \ldots, T_m$ be target values given by a user. The L similar data records may be detected as follows:

1. Evaluate the objective function between data record $dr_{ji}$ and each target value $T_1, \ldots, T_m$ to obtain $f_{i1}, \ldots, f_{im}$, respectively. $f_{i1}, \ldots, f_{im}$ are a measure of the similarity between $dr_{ji}$ and each of the target values.
2. Average $f_{i1}, \ldots, f_{im}$ to obtain $f'_{ji}$, a measure of the similarity between $dr_{ji}$, the i-th data record associated with the j-th entry in the signature table, and target values $T_1, \ldots, T_m$.
3. Repeat steps 1–2 for each data record $dr_{j1}, \ldots, dr_{jq}$ to obtain $f'_{j1}, \ldots, f'_{jq}$.
4. Let $f'_{(j-1)1}, \ldots, f'_{(j-1)L}$ be the largest L evaluations based on the objective function associated with the (j−1)-th entry in the signature table. Determine the L largest values of $f'_{j1}, \ldots f'_{jq}, f'_{(j-1)1}, \ldots, f'_{(j-1)L}$.
5. The L similar data records sought are those of $dr_{j1}, \ldots, dr_{jq}, dr_{(j-1)1}, \ldots, dr_{(j-1)L}$ which correspond to the largest L values of $f'_{j1}, \ldots, f'_{jq}, f'_{(j-1)1}, \ldots, f'_{(j-1)L}$.
6. Let $g_1, \ldots, g_L$ be the largest values of $f'_{j1}, \ldots, f'_{jq}, f'_{(j-1)1}, \ldots f'_{(j-1)L}$. Let $F_j$ be the average of $g_1, \ldots, g_L$. $F_j$ is a value, based on the objective function and evaluated with respect to the L similar data records detected, that may be compared with an optimistic bound corresponding to other entries (e.g. (j+1)-th entry) of the signature table.

In step 440 a value based on the objective function, and evaluated with respect to the similar data records detected in step 430, is compared with the optimistic bound corresponding to the (j+1)-th entry in the signature table. For example, a value such as $F_j$ may be compared with an optimistic bound corresponding to the (j+1)-th index (e.g. the upper bound found in step 390 of FIG. 3). If such a value is greater than the optimistic bound (e.g. if $F_j$>optimistic bound) then the search for data records similar to target value(s) may be stopped. In other words, a measure of similarity that exceeds the optimistic expectation for the remaining data records, pointed at by remaining entries in the signature table, has been found and the process terminates.

If an optimistic measure of similarity for the remaining data records is not exceeded then in step 450 the counter j is incremented and steps 430 and 440 may be repeated. In step 460 a decision is made whether the entire signature table has been searched. If the entire signature table has been searched the process terminates. Hence, data records, which are similar to user defined target values, detected at termination time correspond to the largest (average) evaluation of the objective function.

The branch and bound method illustrated in FIG. 4 may be sped up by early termination. The process may be terminated early based on several possible criteria. For example, terminate the process when a user defined percentage of the total data records stored in a database have been searched. Alternatively, the process may be terminated when the difference between the value of $F_j$ and the optimistic bound corresponding the (j+1)-th entry in the signature table is within a user defined tolerance level.

Figure 5:
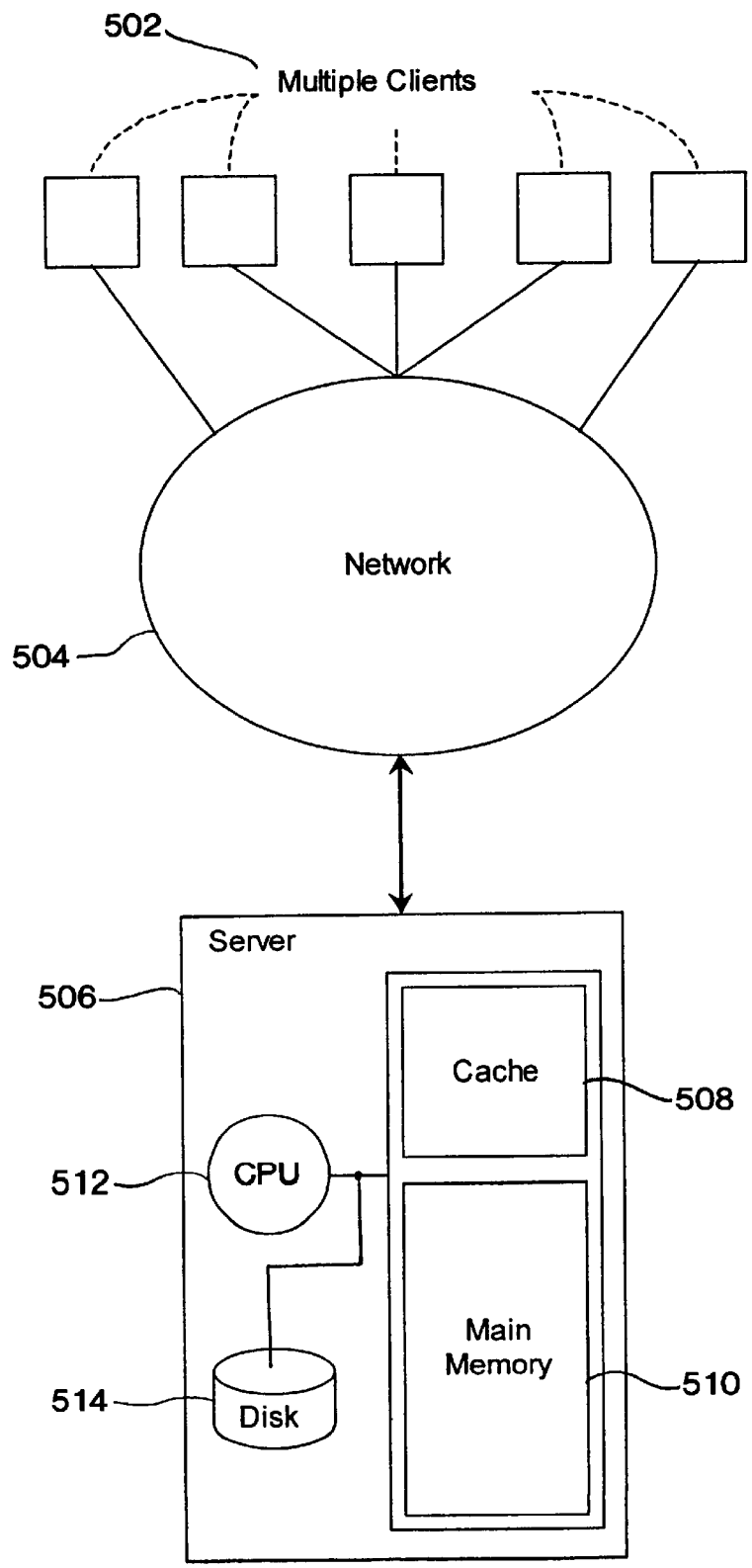
FIG. 5 is a block diagram of an apparatus for analyzing information over a computer network in accordance with an exemplary embodiment of the present invention.

FIG. 5 is a block diagram of an apparatus for analyzing information over a computer network in accordance with an exemplary embodiment of the present invention. In the embodiment depicted in FIG. 5, multiple client computers 502 may access a server 506, for example a Web server, over a network 504. Server 506 may have a data memory 510 as well as a cache 508. The server may further include a Central Processing Unit (CPU) 512 for processing information, and a disk 514 for storing data. Data values and data records may be collected from client computers 502 by server 506 over network 504. Clients 502 may also query server 506 regarding the information stored in data memory 510 and disk 514. In particular, a client computer may supply server 506 with m target value(s), an objective function, as well as the number of similar data records sought L. Server 506 detects L similar data records, stored in a database on disk 514 and in data memory 510, l and sends the analysis results back to the client computer. The results of the analysis and the similar data records detected may be displayed to a user at the client computer end, for example, either in the form of text or in graphical form.

E-COMMERCE EXAMPLE

The following definitions are helpful in understanding the e-commerce example:

e-commerce e-commerce denotes Electronic Commerce. Electronic commerce refers to the process of trading goods and commodities by electronic means, for example, purchases made over the Internet. The increasing popularity of the Internet has made e-commerce applications of commercial importance. One aspect e-commerce applications is the availability of transaction histories for customers. Databases may be maintained for different consumers. The information stored in these databases may be analyzed for the purpose of providing product recommendations to customers concerning, for example, items for sale.

Recommendations

In an e-commerce application it may be desirable to predict the purchasing characteristics of individual customers. Purchasing behavior predictions may be made by analyzing information stored in a database of transaction records. Computer technology enables databases of information regarding a customer's transaction history to be maintained. It may be desirable, for example for marketing purposes, to predict the types of products which may be preferred by a customer. Information stored in customer transaction databases may be analyzed to detect customers that exhibit "similar" purchasing behavior. The set of customers who are similar to a given target customer, is referred to as a "peer group". Based on the purchasing behavior of the "peer group" it may be possible to predict the types of products which may be preferred by a target customer. The predicted (preferred) items may be provided to the target customer as a list of recommended items.

Promotion List

A promotion list is a list of items used to restrict the number of products which may be recommended to a target customer. For example, although a hundred thousand items may be offered for sale by a retail organization, it may be desirable to restrict the recommended items to one hundred of the items. This restricted list is referred to as a promotion list. A promotion list may be used, for example, in order to promote the sale of specific products.

Peer Group

A peer group is a group of L data records "similar" to m given target values (records). For example, each record may correspond to a transaction or purchase made by a customer. Data values of the transaction records may correspond to items for sale, quantities of items for sale, or numbers of items purchased belonging to various product categories. As a peer group is "similar" to m given target values, the purchasing patterns of the peer group may be used to make recommendations.

Collaborative Filtering Applications

Collaborative filtering applications are applications in which the behavior of a peer group of target values may be used to provide recommendations. Consider, for example, a database containing information regarding the purchasing behavior of different supermarket customers. For each customer a database transaction record exists indicating which items were purchased. Hence a transaction record may be a string of 1's and 0's (a Boolean number), where 1 indicates purchased and 0 indicates not purchased. A target customer may thus be represented by a Boolean number. A peer group of the target customer may be found by identifying Boolean numbers in the database which are "similar", as discussed in the foregoing. L "similar" Boolean numbers comprising the peer group may be detected. Based on the purchases indicated by the peer group, recommendations may be made to the target customer.

Figure 6:
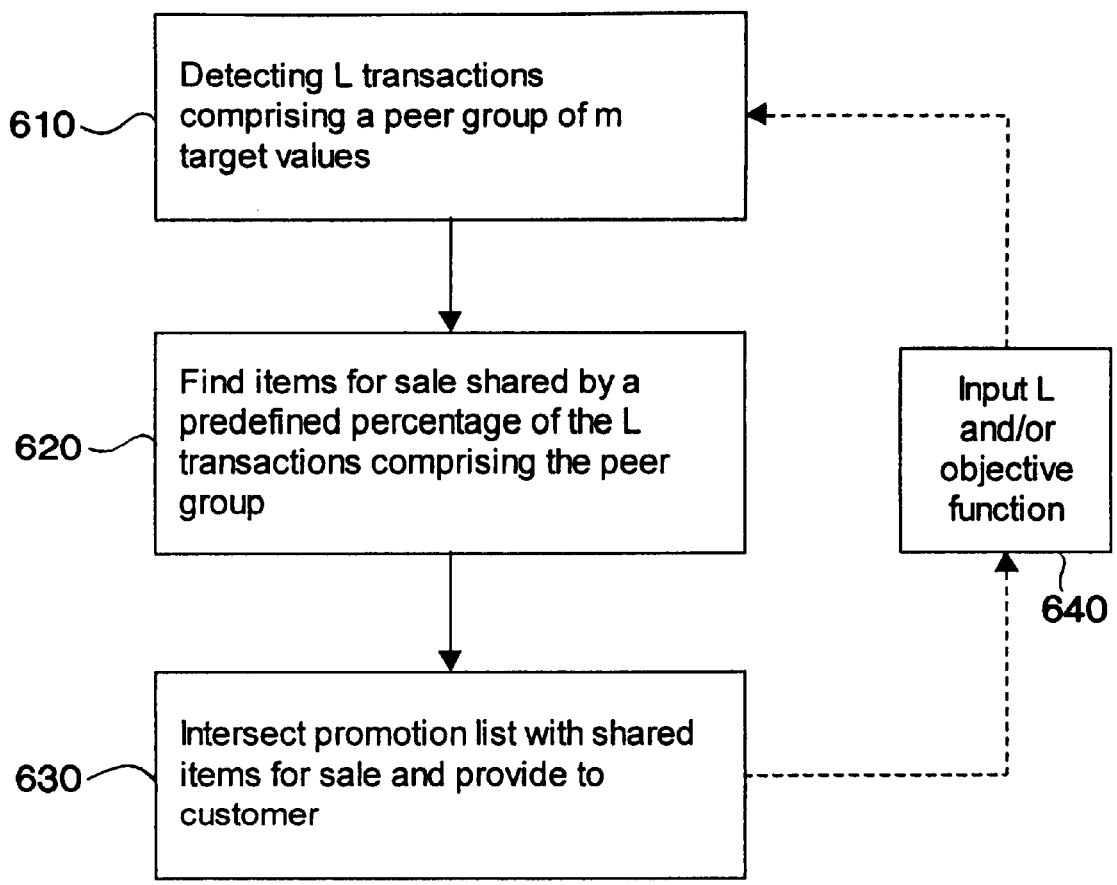
FIG. 6 is a flow chart diagram illustrating an exemplary interactive collaborative filtering application in accordance with an exemplary embodiment of the present invention.

FIG. 6 is a flow chart diagram illustrating an exemplary interactive collaborative filtering application. In step 610 L data records (or transactions) that are comparable ("similar") to m target values are detected. Both the target values and the integer L may be defined by a user. Further, a user may also specify an objective function. The L data records may be detected, for example, using the method illustrated in the foregoing and in FIGS. 1–5. In step 620 a set of items which are shared by some or all of the L detected data records is found. The set of shared items may be found, for example, by identifying the set of items shared by a predetermined percentage of the L detected data records. In step 630 the set of shared items is intersected with a promotion list. The items in the intersection may be, for example, provided to a customer. Note that the collaborative filtering application of FIG. 6 may be made interactive by allowing a user to vary L, for a fixed set of target values, for each repetition of steps 610, 620, and 630. Step 640 may be added to allow a user to interactively input L (the number of "similar" data records sought).

For example, suppose that for a target customer the set of shared items is {Bread, Butter, Jam, Milk}. Suppose further that a supermarket chooses a promotion list {Bread, Milk, Sausage}. Then the items in the intersection, namely, {Bread, Milk}={Bread, Butter, Jam, Milk}∩{Bread, Milk, Sausage}, may be recommended to the target customer.

A signature table may be built, as explained in the foregoing, independent of the choice of an objective function. Therefore, the signature table may be used interchangeably with various objective functions. Hence, a desirable (albeit optional) aspect of the invention is the ability to allow a user to interactively specify an objective function. Once a signature table is built, a user may interactively specify an objective function in step 640. Bounds may then be calculated based on the interactively defined objective function. For each repetition of steps 610, 620, and 630 the signature table need not be rebuilt.

Figure 7:
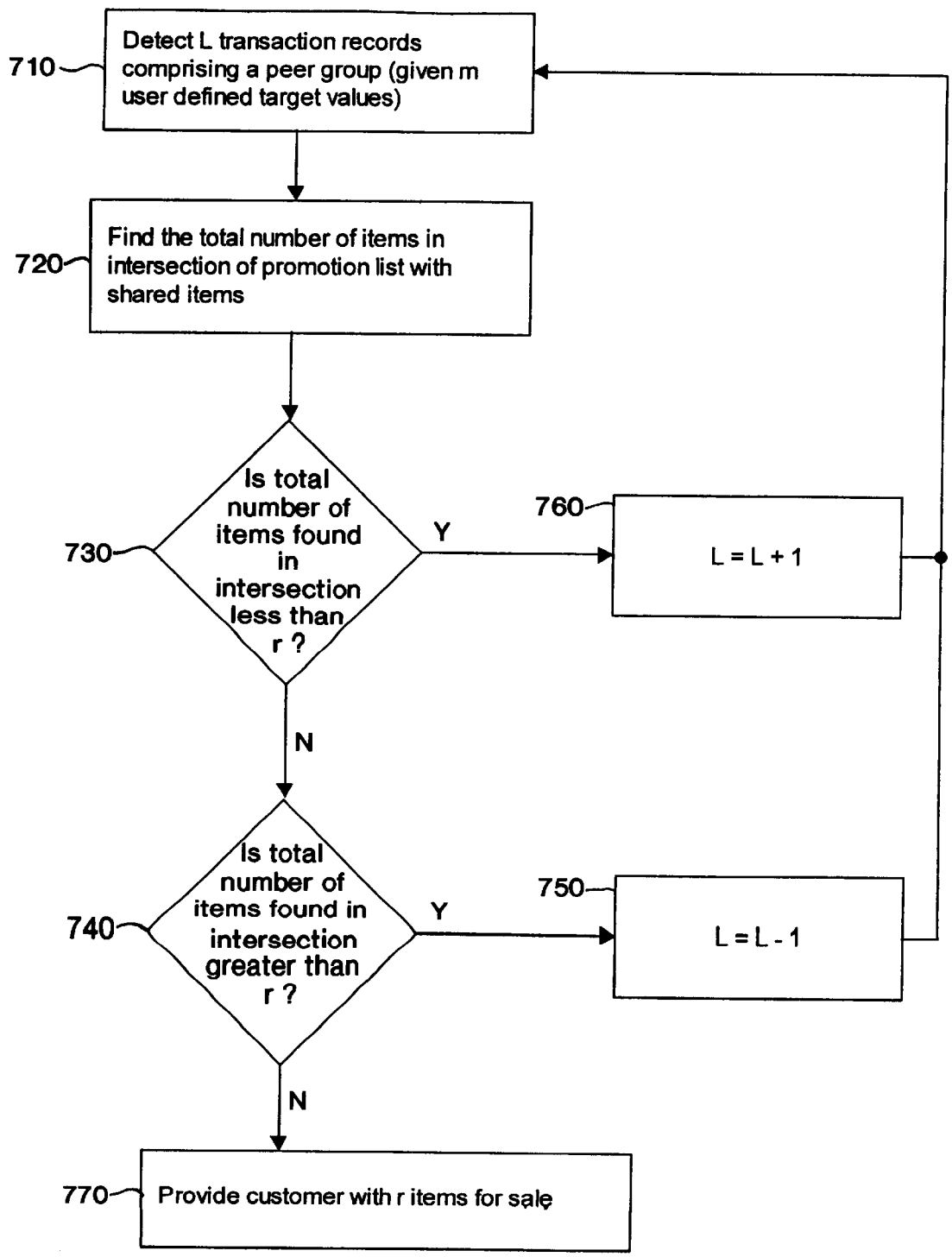
FIG. 7 is a flow chart diagram illustrating an exemplary collaborative filtering application in accordance with an exemplary embodiment of the present invention.

FIG. 7 is a flow chart diagram illustrating another exemplary collaborative filtering application. Given m user defined target values, in step 710 L data records (or transactions) that are comparable ("similar") to m user defined target values are detected. The value of L may be initialized by a user. In step 720 a set of items which are shared by some or all of the L detected data records is found, and the set of shared items is intersected with a promotion list. The total number of items in the intersection (preferred items to be provided to a customer) is stored. In step 730 the total number of items in the intersection is compared with a given number, say r. If the total number of items is less than r then in step 760 L is incremented, and steps 710, 720, and 730 are repeated. Otherwise, a decision is made in step 740 whether the total number of items is greater than r. If the total number of items in the intersection is greater than r then in step 750 L is decremented, and steps 710, 720, and 730 are repeated. If the number of items in the intersection is r, then these items are provided (recommended) to a customer in step 770. One of ordinary skill in the art will readily recognize how to modify the method of FIG. 7, so that items may be provided to a customer if the number of items in the intersection is within a tolerance level of r, i.e. r $\pm e_{tl}$.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. A method of analyzing information in the form of a plurality of data records, each data record including at least one data value of a plurality of data values, said method comprising the steps of:

(a) partitioning the plurality of data values into a plurality of data signatures;

(b) comparing ones of the plurality of data signatures to a data record of the plurality of data records;

(c) associating an index with the data record based on the result of step (b); and (d) calculating a bound corresponding to the index and based on a user defined target value and an objective function.

2. The method according to claim 1, wherein the objective function is a function of a match number and a hamming distance.

3. The method according to claim 1, wherein the index is a Boolean index.

4. The method according to claim 1, wherein the step of partitioning the plurality of data values, further comprises the steps of:

calculating a distance between a first data value of the plurality of data values and a second data value of the plurality of data values; and detecting a plurality of clusters of ones of the plurality of data values based on the distance.

5. The method according to claim 1, wherein steps (b)–(c) are repeated until each respective data record of the plurality of data records is associated with a respective index of a plurality of indices, and step (d) is repeated until a respective bound corresponding to each respective index of the plurality of indices is calculated.

6. The method according to claim 5, further comprising the steps of:
(a) sorting respective ones of the plurality of indices based on the respective bound;
(b) searching ones of the plurality of data records based on sorted ones of the plurality of indices; and
(c) detecting at least one of the plurality of data records that is comparable to the user defined target value based on the objective function.

7. A method of analyzing information in the form of a plurality of data records, each data record including at least one data value of a plurality of data values, said method comprising the steps of:
(a) partitioning the plurality of data values into a plurality of data signatures;
(b) comparing ones of the plurality of data signatures to a data record of the plurality of data records;
(c) associating an index with the data record based on the result of step (b); and
(d) calculating a bound corresponding to the index and based on at least one of a plurality of user defined target values and an objective function.

8. The method according to claim 7, wherein the index is a Boolean index.

9. The method according to claim 7, further comprising the steps of:
(e) repeating steps (b)–(c) until each respective data record of the plurality of data records is associated with a respective index of a plurality of indices; and
(f) repeating step (d) until a respective bound corresponding to each respective index of the plurality of indices is calculated.

10. The method according to claim 9, further comprising the steps of:
(g) sorting respective ones of the plurality of indices based on the respective bound;
(h) searching ones of the plurality of data records based on sorted ones of the plurality of indices; and
(i) detecting at least one of the plurality of data records that is comparable to at least one of the plurality of user defined target values based on the objective function.

11. The method according to claim 10, wherein the objective function is chosen by the user.

12. The method according to claim 10, wherein each of the plurality of data records is obtained by measuring physical attributes of a plurality of objects.

13. The method according to claim 10, wherein an interactively defined number L of the plurality of data records that are comparable to m user defined target values of the plurality of user defined target values are detected.

14. The method according to claim 13, wherein the plurality of data values represent a plurality of items for sale, the plurality of data records are a plurality of transaction records associated with a plurality of customers, and the L data records detected are L transaction records of the plurality of transaction records, the L transaction records comprising a peer group of the m user defined target values.

15. The method according to claim 14, wherein ones of the plurality of items for sale are provided to a customer based on an intersection between a promotion list and ones of the plurality of items for sale of ones of the L transaction records of the peer group.

16. The method according to claim 15, further comprising the steps of:
(j) comparing a total number of the ones of the plurality of items for sale provided to the customer with a given value r;
(k) repeating steps (h)–(i) to detect L'<L transaction records comprising the peer group of the m user defined target values, if the total number of the ones of the plurality of items for sale provided to the customer is greater than r; and
(l) repeating steps (h)–(i) to detect L'>L transaction records comprising the peer group of the m user defined target values, if the total number of the ones of the plurality of items for sale provided to the customer is smaller than r.

17. The method according to claim 10, wherein the objective function is interactively specified by a user.

18. The method according to claim 17, wherein the objective function is interactively specified for each repetition of steps (d)–(i).

19. An article of manufacture comprising a computer usable medium having computer readable program code means embodied therein for analyzing information in the form of a plurality of data records, each data record including at least one data value of a plurality of data values, the computer readable program code means in said article of manufacture comprising computer readable program code means for causing a computer to effect:
(a) partitioning the plurality of data values into a plurality of data signatures;
(b) comparing ones of the plurality of data signatures to a data record of the plurality of data records;
(c) associating an index with the data record based on the result of step (b); and
(d) calculating a bound corresponding to the index and based on a user defined target value and an objective function.

20. An article of manufacture comprising a computer usable medium having computer readable program code means embodied therein for analyzing information in the form of a plurality of data records, each data record including at least one data value of a plurality of data values, the computer readable program code means in said article of manufacture comprising computer readable program code means for causing a computer to effect:
(a) partitioning the plurality of data values into a plurality of data signatures;
(b) comparing ones of the plurality of data signatures to a data record of the plurality of data records;
(c) associating an index with the data record based on the result of step (b); and
(d) calculating a bound corresponding to the index and based on at least one of a plurality of user defined target values and an objective function.

21. An article of manufacture as recited in claim 20, the computer readable program code means in said article of manufacture further comprising computer readable program code means for causing a computer to effect:
(e) repeating steps (b)–(c) until each respective data record of the plurality of data records is associated with a respective index of a plurality of indices; and
(f) repeating step (d) until a respective bound corresponding to each respective index of the plurality of indices is calculated.

22. An article of manufacture as recited in claim 21, the computer readable program code means in said article of manufacture further comprising computer readable program code means for causing a computer to effect:
(g) sorting respective ones of the plurality of indices based on the respective bound;

(h) searching ones of the plurality of data records based on sorted ones of the plurality of indices; and (i) detecting at least one of the plurality of data records that is comparable to at least one of the plurality of user defined target values based on the objective function.

23. An article of manufacture as recited in claim 22, wherein an interactively defined number L of the plurality of data records that are comparable to m user defined target values of the plurality of user defined target values are detected.

24. An article of manufacture as recited in claim 23, wherein the plurality of data values represent a plurality of items for sale, the plurality of data records are a plurality of transaction records associated with a plurality of customers, and the L data records detected are L transaction records of the plurality of transaction records, the L transaction records comprising a peer group of the m user defined target values.

25. A computer program product comprising a computer usable medium having computer readable program code means embodied therein for causing an analysis of information in the form of a plurality of data records, each data record including at least one data value of a plurality of data values, the computer readable program code means in said computer program product comprising computer readable program code means for causing a computer to effect:

(a) partitioning the plurality of data values into a plurality of data signatures;

(b) comparing ones of the plurality of data signatures to a data record of the plurality of data records;

(c) associating an index with the data record based on the result of step (b); and (d) calculating a bound corresponding to the index and based on a user defined target value and an objective function.

26. A computer program product comprising a computer usable medium having computer readable program code means embodied therein for causing an analysis of information in the form of a plurality of data records, each data record including at least one data value of a plurality of data values, the computer readable program code means in said computer program product comprising computer readable program code means for causing a computer to effect:

(a) partitioning the plurality of data values into a plurality of data signatures;

(b) comparing ones of the plurality of data signatures to a data record of the plurality of data records;

(c) associating an index with the data record based on the result of step (b); and (d) calculating a bound corresponding to the index and based on at least one of a plurality of user defined target values and an objective function.

27. A method of searching a computer database for at least one of a plurality of data records that is comparable to a user defined target value, each data record including at least one data value of a plurality of data values, said method comprising the steps of:

(a) partitioning the plurality of data values into a plurality of data signatures;

(b) comparing ones of the plurality of data signatures to a data record of the plurality of data records;

(c) associating an index with the data record based on the result of step (b);

(d) calculating a bound corresponding to the index and based on the user defined target value and an objective function;

(e) repeating steps (b)–(c) until each respective data record of the plurality of data records is associated with a respective index of a plurality of indices;

(f) repeating step (d) until a respective bound corresponding to each respective index of the plurality of indices is calculated;

(g) sorting respective ones of the plurality of indices based on the respective bound;

(h) searching ones of the plurality of data records based on sorted ones of the plurality of indices; and (i) detecting said at least one of the plurality of data records that is comparable to the user defined target value based on the objective function.

28. A method of searching a computer database according to claim 27, wherein the plurality of data records are stored on a server computer, and the user defined target value is provided by a client computer.

29. The method of searching a computer database of claim 28, wherein the plurality of data records which are stored on the server computer and said at least one data value included in each data record are collected from the client computer.

* * * * *